US006502908B1

(12) United States Patent
Mueller et al.

(10) Patent No.: US 6,502,908 B1
(45) Date of Patent: Jan. 7, 2003

(54) CONTROL SYSTEM FOR A VEHICLE

(75) Inventors: Armin Mueller, Gechingen (DE); Thomas Roehrig-Gericke, Weil im Schoenbuch (DE); Reinhold Schoeb, Gaeufelden (DE); Harry Troester, Tamm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/561,899

(22) Filed: May 1, 2000

(30) Foreign Application Priority Data

Apr. 30, 1999 (DE) .......................... 199 19 675

(51) Int. Cl.⁷ ................................ B60T 8/32
(52) U.S. Cl. .................. 303/191; 188/DIG. 2
(58) Field of Search .................. 303/177, 155, 303/157, 158, 144, 191, 176; 701/70; 188/DIG. 2

(56) References Cited

U.S. PATENT DOCUMENTS

| 5,209,329 A | * | 5/1993 | Sigl et al. ............ 303/176 |
| 5,415,467 A | * | 5/1995 | Utz et al. ............. 303/89 |
| 5,492,397 A | * | 2/1996 | Steiner et al. ........ 303/157 |
| 5,564,797 A | * | 10/1996 | Steiner et al. ........ 303/176 |
| 5,669,676 A | * | 9/1997 | Rump et al. .......... 303/125 |
| 5,719,769 A | * | 2/1998 | Brugger et al. ....... 303/155 |
| 5,727,854 A | * | 3/1998 | Pueschel et al. ...... 303/155 |
| 5,984,429 A | * | 11/1999 | Nell et al. ............ 303/155 |
| 6,134,498 A | * | 10/2000 | Oba ..................... 701/70 |
| 6,193,332 B1 | * | 2/2001 | Ono ..................... 303/191 |

FOREIGN PATENT DOCUMENTS

| DE | 41 18 332 A1 | 5/1991 |
| DE | 4118332 | 5/1991 |
| DE | 195 25 552 A1 | 1/1997 |
| DE | 196 11 360 C2 | 1/1998 |

* cited by examiner

Primary Examiner—Matthew C. Graham
Assistant Examiner—Mariano Sy
(74) Attorney, Agent, or Firm—Crowell & Moring LLP

(57) ABSTRACT

A control system for a vehicle has a detection device for generating signals which describe the operating and vehicle state. The latter signals are supplied to a regulating and control unit which generates actuating signals for switching on and off a vehicle component that influences a brake servo device for automatically producing braking force if the accelerator pedal is not actuated by the driver. This "acceleration—automatic braking" mode is triggered if the brake pedal has been actuated in a prescribed manner within a defined period of time.

22 Claims, 2 Drawing Sheets

CONTROL SYSTEM FOR A VEHICLE

BACKGROUND AND SUMMARY OF THE INVENTION

This application claims the priority of German patent document 199 19 675.3, filed Apr. 30, 1999, the disclosure of which is expressly incorporated by reference herein. The invention relates to a system for automatically controlling operation of a vehicle.

German patent document DE 41 18 332 A1 discloses a system for controlling a vehicle driving device which is intended to relieve the burden on the driver in stop-and-go operation on overcrowded roads. In stop-and-go operation, the motive power of the vehicle is controlled automatically so that the current vehicle speed makes a transition to a predetermined target speed. If the driver actuates the brake pedal, the motive power is automatically interrupted. If the driver releases the brake pedal, the vehicle resumes the target speed.

It is, of course, possible with such a control system to move the vehicle exclusively by actuation of the brake pedal in stop-and-go operation. However, this assumes that the target speed (which the vehicle is not to exceed in congested traffic) is specified by the driver. Because the traffic situation is normally continuously changing, in order to avoid critical situations, the driver is forced either to concentrate harder on the traffic and, if appropriate, actuate the brake pedal to prevent the vehicle from accelerating unintentionally to a high target speed not suitable for the current traffic situation, or the driver must continuously adapt the target speed to the current situation. In both cases, the aim of relieving the burden on the driver is not adequately achieved.

One object of the invention is to provide a simple and inexpensive control system which minimizes the burden on the driver of a motor vehicle, and allows reliable control of the vehicle in dense traffic.

This and other objects and advantages are achieved by the control system according to the invention which embodies the fundamental premise that the driver must actively take the initiative to move the vehicle, and if he or she does not, a brake servo device is automatically switched on, braking the vehicle. (This is referred to herein as the "acceleration by the driver—automatic braking mode.")

The procedure according to the invention also has the advantageous feature that the "acceleration by the driver—automatic braking mode" is not initiated, and the vehicle cannot be braked automatically without the implementation of a predefined vehicle operation pattern by the driver (as discussed hereinafter), thereby increasing safety in the case of incorrect responses by the driver, e.g. a delayed reaction. Another important advantage is that the driver is not compelled to enter commands, such as target values, into the control system.

The control system according to the invention is particularly suitable for driving in congested traffic.

Adaptation to the traffic situation is performed by actuation of the accelerator pedal, which is to be carried out by the driver, thus eliminating the need for any additional, expensive measures or devices for correction of the system to match the traffic. At the same time, safety is increased by the automatic brake actuation if the accelerator pedal remains unactuated, thereby compensating for lack of response or excessively late responses by the driver.

The "acceleration by the driver—automatic braking" mode is triggered automatically by detection, in a detection device of the control system, of a defined actuation of the brake pedal corresponding to a predetermined braking scheme. Automatic triggering of the "acceleration—automatic braking" mode, which is suitable, in particular, for stop-and-go operation, has the advantage that the driver does not have to consciously trigger the ideal mode for driving in congested traffic; instead, the system detects congested traffic automatically. Moreover, there is no need for forward-looking sensors, (e.g., radar or optical detection units), to detect vehicles travelling ahead. A device which detects the current position of the brake pedal is sufficient to detect congested traffic.

The "acceleration—automatic braking" mode is advantageously triggered if the brake pedal is actuated at least twice in succession within a defined period of time, preferably if the vehicle is decelerated to a halt in each individual braking operation and the brake pedal is released between the two braking operations. This braking scheme can be employed as a reliable trigger criterion and accidental unintentional triggering can be reliably excluded since the trigger conditions have been specified with sufficient accuracy to eliminate confusion with other traffic situations, such as braking to a halt at a traffic light.

In a preferred development, a brake pressure which results in a desired deceleration characteristic curve of the vehicle is built up during the braking phase in the "acceleration—automatic braking" mode. The deceleration characteristic curve or function can be chosen so that stopping can be performed in a particularly comfortable manner. In this context, it is possible to allow for longitudinal elasticity of the vehicle in such a way that longitudinal vibrations at the moment of stopping are minimized.

It is advantageous if the brake pressure is also maintained even when the vehicle is stationary if the accelerator pedal remains unactuated, in order to ensure the maximum degree of reliability. It is also possible in this context to allow for the slope of the road by adjusting the brake pressure in accordance with the slope of the road in such a way that the vehicle remains stationary. In addition (or as an alternative) to the actuation of the wheel brake, it is also possible to activate a parking brake when the vehicle is stationary. Activating the parking brake offers the advantage that a braking force which immobilizes the vehicle can be produced irrespective of the vehicle state. Thus, it is possible, in particular, to immobilize the vehicle even when the internal combustion engine is switched off and/or if the driver gets out.

As a trigger condition for cancelling the "acceleration—automatic braking" mode a vehicle state variable is preferably checked to determine whether it exceeds a predetermined limiting value. Suitable vehicle state variables in this context are, in particular, the vehicle speed and/or the steering-wheel angle. These state variables are usually available in any case for further control interventions which stabilize the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
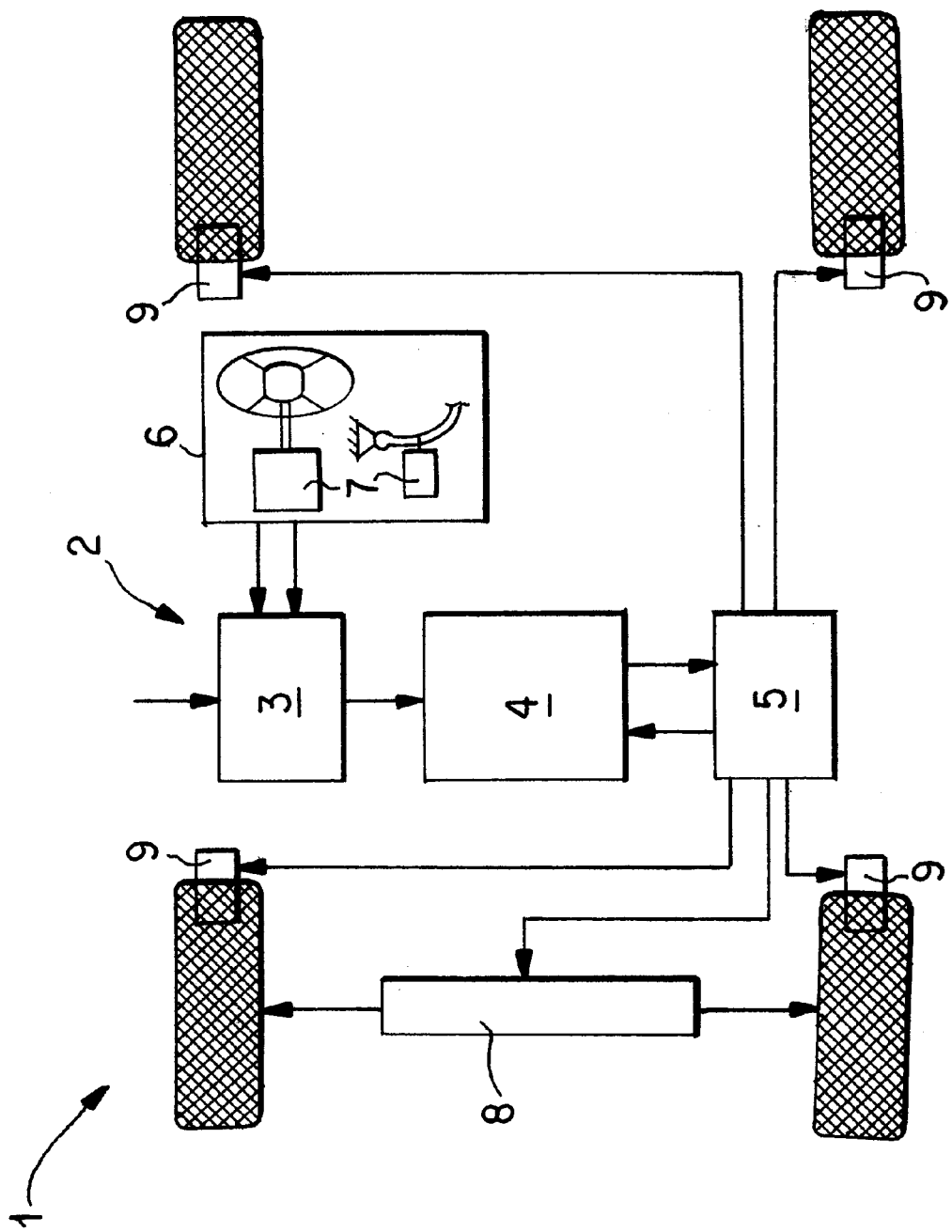
FIG. 1 shows a schematic representation of a vehicle with a control system according to the invention.

The motor vehicle 1 illustrated in FIG. 1 comprises a control system 2 which allows partially automated driving in stop-and-go operation in the case of a traffic jam or in dense traffic. The control system 2 comprises a detection device 3, a regulating and control unit 4 and a hydraulic unit 5. The detection device 3 generates signals which characterize the operating state and vehicle state of the vehicle. In particular, the detection device 3 is assigned a measuring device 7 which measures the current steering angle and the current actuation position of the accelerator pedal and the brake pedal in the vehicle interior 6. The detection device 3 can also be supplied with the current vehicle speed v and, if appropriate, vehicle parameters such as a mass value and a friction coefficient as further operating and state variables of the vehicle.

The vehicle operating and state variables determined by or supplied to the detection device 3 are supplied to the regulating and control unit 4 as input signals. The regulating and control unit 4 furthermore receives actual-value signals from the hydraulic unit 5 which represent the current state of actuators 8, 9 for the steering and the wheel brake. In the regulating and control unit 4, required-value signals are generated in accordance with a stored control algorithm, taking into account the operating and state variables supplied and the actual-value signals supplied, these required-value signals being supplied to the hydraulic unit 5 to adjust the steering actuator 8 and the is brake actuators 9.

The control system 2 contains a brake servo device for automatically producing braking force irrespective of the current position of the brake pedal. The brake servo device serves, on the one hand, to boost a braking-force requirement desired by the driver and, on the other hand, for automated or partially automated generation of braking force as a function of the current traffic situation. However, automated production of braking force is carried out only if the corresponding trigger conditions have been met.

Figure 2:
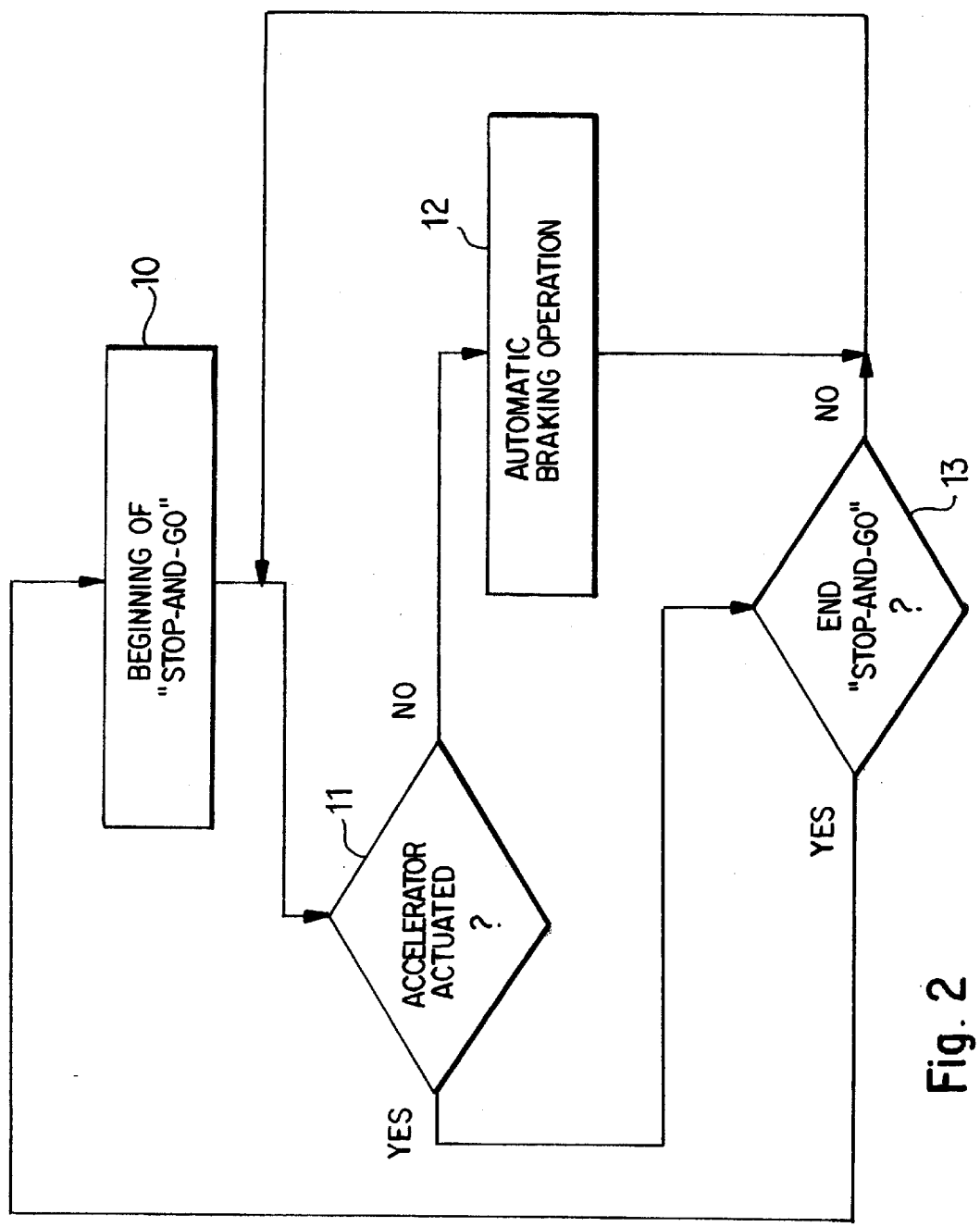
FIG. 2 shows a flow diagram for the control of a vehicle in stop-and-go operation.

FIG. 2 shows a method for carrying out an automated braking operation in stop-and-go operation. In a first method step 10, the system checks whether the conditions for the beginning of stop-and-go operation are present. These conditions are checked with reference to a defined actuating scheme for the brake pedal. According to a preferred embodiment, the brake pedal must have been actuated at least twice in succession within a defined period of time to trigger stop-and-go operation, which is characterized by an "acceleration—automated braking" mode, and the vehicle must have been decelerated to a lower limiting speed (preferably brought to a halt) in each braking operation. Between successive braking operations, the brake pedal must be released. Compliance with this specific braking scheme ensures that stop-and-go operation is detected reliably, even without a forward-looking sensor, and the risk of confusion is eliminated.

It may be expedient to specify more than two individual braking operations as a trigger criterion. It is furthermore possible to specify a minimum deceleration for each braking operation as a condition to be fulfilled. It may also be sufficient for the brake pedal to be released at least partially, rather than completely, between two successive braking operations.

As an alternative braking scheme suitable for triggering purposes in stop-and-go operation, it is possible, according to a further embodiment, for the system to check whether the brake pedal has been depressed completely at least once and expediently whether the vehicle furthermore fulfils a further condition, in particular has been braked to a halt.

If the conditions for stop-and-go operation are present, the system switches in method step 10 to the "acceleration—automatic braking" operating mode, which is characterized by method steps 11 and 12.

In method step 11, the system checks whether the accelerator pedal is being actuated by the driver. If not, ("No" branch), the system progresses to method step 12, according to which an automatic braking operation is carried out, irrespective of the actuation of the brake pedal. As a result of this combination of method steps 11 and 12, stop-and-go operation consists exclusively of the driving states of acceleration, initiated and controlled by the driver, and braking or stopping, initiated and controlled by the brake servo device. As soon as the driver releases the accelerator pedal, an automated braking operation is carried out.

If the system detects in method step 11 that the driver is actuating the accelerator pedal ("Yes" branch), it progresses to method step 13, in which a check is made to determine whether the conditions for ending stop-and-go operation are present. As the trigger condition, it is expedient, for example, if at least one vehicle state variable is checked to determine whether it exceeds a limiting value. Suitable vehicle state variables for consideration here are the vehicle speed and the steering-wheel angle; expedient limiting values are 60 km/h for the speed and about 120° for the steering-wheel angle. If the conditions for ending the "acceleration—automatic braking" mode have been fulfilled, the system returns to the first method step 10 in accordance with the Yes branch of method step 13, and, in the next cycle, the system checks again whether the conditions for restarting stop-and-go operation are present. If the trigger condition in method step 13 is not fulfilled, the system returns to the beginning of method step 11 in accordance with the No branch. In this case, the control system is in the "acceleration—automatic braking" mode as before, in which mode method steps 11, 12, 13 are checked in a new cycle.

As an alternative to the automated beginning or automated end of stop-and-go operation, a manual command, produced deliberately by the driver, for triggering and/or ending the "acceleration—automatic braking" mode can be taken into account. Manual triggering can be performed by means of a switch, a cruise control lever or even by some other physical response, such as voice input, as can ending of this mode.

During the "acceleration—automatic braking" mode, brake pressure is expediently maintained in the phases of automatic braking, even after the vehicle has come to a halt. The level of this brake pressure is preferably chosen so that the vehicle does not roll away on its own, even on slopes. If appropriate, a suitable measuring device is used to sense the slope, which is used as a basis for determining the necessary brake pressure.

As a further option, suitable sensors can be used to allow for whether the driver would like to leave or has left the vehicle (e.g., sensors on the door or weight sensors in the driver's seat). In this case, it is desirable to actuate the parking brake automatically.

The prescribed control system is suitable particularly for use in electrohydraulic brake systems, but can also be used in other types of brake system. The control system can furthermore be coupled to electronic stability programs in the vehicle. Coupling to traction control systems and electronic traction systems, by means of which braking by way of the rear axle can be implemented, is furthermore also possible.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A control system for a vehicle having an accelerator pedal and a brake pedal, comprising:

a detection device for producing signals which describe operation and state of the vehicle, including actuation of the brake pedal and the accelerator pedal;

a brake servo device for automatically applying a braking force to the vehicle; and a control unit which receives signals produced by the detection device, and generates actuating signals for switching on and off the brake servo device; wherein said control unit commences an "acceleration by driver—automatic braking" mode of said vehicle in response to detection of a predetermined pattern of control actions by an operator; and of the vehicle during a time when the vehicle is in said "acceleration by driver—automatic braking" mode, said control unit such that the brake servo device is switched on only when the accelerator pedal is in a released state, and is switched off only when the accelerator pedal is in an actuated state.

2. A control system according to claim 1, wherein the "acceleration by driver—automatic braking" mode is set if the brake pedal is actuated at least twice in succession within a defined period of time.

3. The control system according to claim 1, wherein the vehicle must be decelerated to a halt in each braking operation to trigger the "acceleration by driver—automatic braking" mode.

4. The control system according to claim 2, wherein a minimum deceleration must be achieved in each braking operation to trigger the "acceleration by driver—automatic braking" mode.

5. The control system according to claim 1, wherein the brake pedal must be at least partially released between two successive braking operations to trigger the "acceleration by driver—automatic braking" mode.

6. The control system according to claim 1, wherein the brake pedal must be depressed fully at least once to trigger the "acceleration by driver—automatic braking" mode.

7. The control system according to claim 1, wherein the "acceleration by driver—automatic braking" mode is indicated in the vehicle.

8. The control system according to claim 1, wherein a brake pressure corresponding to a predetermined characteristic curve is built up in the brake servo device during the braking phase in the "acceleration by driver—automatic braking" mode.

9. The control system according to claim 1, wherein said servo brake device causes an application of vehicle brakes according to a deceleration characteristic curve.

10. The control system according to claim 9, wherein braking is performed at a constant deceleration rate.

11. The control system according to claim 1, wherein the vehicle can be braked to a halt in a braking phase in the "acceleration by driver—automatic braking" mode.

12. The control system according to claim 1, wherein brake pressure is maintained in the "acceleration by driver—automatic braking" mode when the vehicle is stationary if the accelerator pedal remains unactuated.

13. The control system according to claim 12, wherein slope of a road is determined and brake pressure is adjusted to correspond to said slope so that the vehicle remains stationary.

14. The control system according to claim 1, wherein in the "acceleration by driver—automatic braking" mode, a vehicle parking brake is actuated whenever the accelerator pedal remains unactuated and the vehicle is stationary.

15. The control system according to claim 1, wherein the "acceleration by driver—automatic braking" mode is canceled if at least one vehicle state variable exceeds a limiting value.

16. The control system according to claim 15, wherein the vehicle state variable is vehicle speed.

17. The control system according to claim 15, wherein the vehicle state variable is steering-wheel angle.

18. A method of controlling operation of a vehicle having an accelerator pedal and vehicle brakes, comprising:

detecting occurrence of a predetermined pattern of control actions by an operator of the vehicle;

in response to detection of said predetermined pattern of control actions, commencing an automatic braking mode;

during said automatic braking mode, controlling acceleration and deceleration of said vehicle by activating and deactivating an automatic braking operation of said vehicle brakes as a function of an operation state of said accelerator input by said operator, such that automatic braking operation is activated only when said accelerator pedal is in a released state, and is deactivated only when said accelerator pedal is in a depressed state.

19. A method of controlling operation of a vehicle having an accelerator pedal and vehicle brakes according to claim 18 wherein said pattern of control actions comprises a predetermined sequence of brake actuations implemented by a vehicle driver.

20. The method of controlling operation of a vehicle according to claim 18, wherein said predetermined pattern of control actions comprises a predetermined pattern of brake pedal actuations by said operator.

21. Apparatus for controlling operation of a vehicle having an accelerator pedal and vehicle brakes, comprising:

means for detecting occurrence of a predetermined pattern of control actions by an operator of the vehicle;

means, operative in response to detection of said predetermined pattern of control actions, for controlling acceleration and deceleration of said vehicle by activating and deactivating an automatic braking operation of said vehicle brakes as a function of an operation state of said accelerator pedal input by said operator, such that automatic braking is activated only when said accelerator pedal is in a released state, and is deactivated only when said accelerator pedal is in a depressed state.

22. The method of controlling operation of a vehicle according to claim 21, wherein said predetermined pattern of control actions comprises a predetermined pattern of brake pedal actuations by said operator.

* * * * *